US008651228B2

(12) United States Patent
Eick et al.

(10) Patent No.: US 8,651,228 B2
(45) Date of Patent: Feb. 18, 2014

(54) WHEEL LIFTING APPARATUS

(71) Applicant: ConocoPhillips Company, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/874,084

(22) Filed: Apr. 30, 2013

(65) Prior Publication Data

US 2013/0284534 A1    Oct. 31, 2013

Related U.S. Application Data

(60) Provisional application No. 61/640,349, filed on Apr. 30, 2012.

(51) Int. Cl.
| G01V 1/04 | (2006.01) |
| G01V 1/09 | (2006.01) |
| G01V 1/143 | (2006.01) |
| G01V 1/00 | (2006.01) |
| G01V 1/02 | (2006.01) |

(52) U.S. Cl.
USPC ............................. 181/114; 181/111; 367/189

(58) Field of Classification Search
USPC ................ 181/114, 111, 106, 113, 104, 121; 367/189, 912
See application file for complete search history.

(56) References Cited

U.S. PATENT DOCUMENTS

| 3,106,982 | A | * | 10/1963 | Wade | 181/108 |
| 3,306,391 | A | * | 2/1967 | Bays | 181/114 |
| 3,826,322 | A | * | 7/1974 | Williams | 180/202 |
| 3,905,446 | A | * | 9/1975 | Ross | 181/114 |
| 3,983,957 | A | * | 10/1976 | Silverman | 181/121 |
| 4,011,923 | A | * | 3/1977 | Talke et al. | 181/114 |
| 4,147,228 | A | * | 4/1979 | Bouyoucos | 181/119 |
| 4,248,324 | A | * | 2/1981 | Mifsud | 181/121 |
| 4,492,285 | A | * | 1/1985 | Fair et al. | 181/114 |
| 4,700,804 | A | * | 10/1987 | Trudeau | 181/121 |
| 4,855,967 | A | * | 8/1989 | Sallas et al. | 367/190 |
| 5,031,718 | A | * | 7/1991 | Peavey | 181/114 |
| 5,231,252 | A | * | 7/1993 | Sansone | 181/122 |
| 5,396,029 | A | * | 3/1995 | Talke | 181/114 |
| 5,614,670 | A | * | 3/1997 | Nazarian et al. | 73/146 |

(Continued)

Primary Examiner — Edgardo San Martin
(74) Attorney, Agent, or Firm — ConocoPhillips Company

(57) ABSTRACT

The invention is an electric powered mechanism for lifting and lowering at the wheels for an electric sweep type seismic vibrator source of the type used in seismic prospecting for hydrocarbons. The source uses an engine and generator combination to create electric power for all systems on the source such as driving a frame of linear electric motors that direct a rod or piston to contact the ground in a recurring fashion along with driving the source from location to location through a survey area. Preferably a foot is arranged on the bottom end of the rod or piston for contact with the ground and by engaging the grid of motors to push down against the ground in a rapid progression, acoustic energy is created and delivered into the ground for geophones to sense and record. The electric powered wheel mechanism may be utilized to bring the foot of the rod or piston in contact with the ground or in closer proximity to the ground or level the source prior to emitting the seismic energy or to adjust weight on the acoustic energy delivery system while seismic energy is being delivered.

13 Claims, 3 Drawing Sheets

(56) References Cited

U.S. PATENT DOCUMENTS

| | | | |
|---|---|---|---|
| 6,234,527 B1* | 5/2001 | Poulin et al. | 280/761 |
| 6,532,190 B2* | 3/2003 | Bachrach | 367/25 |
| 6,779,616 B1* | 8/2004 | Brown | 180/13 |
| 7,451,841 B2* | 11/2008 | Nelson | 180/13 |
| 7,813,224 B2* | 10/2010 | Krumhansl et al. | 367/189 |
| 7,841,444 B2* | 11/2010 | Cannell et al. | 181/121 |
| 8,371,416 B2* | 2/2013 | Eick et al. | 181/114 |
| 2007/0063501 A1* | 3/2007 | Majkrzak | 280/763.1 |

* cited by examiner

WHEEL LIFTING APPARATUS

CROSS-REFERENCE TO RELATED APPLICATIONS

This application is a non-provisional application which claims benefit under 35 USC §119(e) to U.S. Provisional Application Ser. No. 61/640,349 filed Apr. 30, 2012, entitled "WHEEL LIFTING APPARATUS," which is incorporated herein in its entirety.

STATEMENT REGARDING FEDERALLY SPONSORED RESEARCH

None.

FIELD OF THE INVENTION

This invention relates to vibratory seismic sources and particularly to seismic sources that are held to the ground to deliver vibratory impulses into the earth for seismic prospecting of hydrocarbons and other subsurface resources.

BACKGROUND OF THE INVENTION

In the process of acquiring seismic data, seismic energy is delivered into the earth. Over the years, the preferred attributes of the seismic energy delivered into the earth have been honed to include a broad spectrum of wavelengths and sufficient power across the spectrum to be recorded at the surface. In general, a suitable land source must be able to deliver seismic energy waves in a spectrum of wavelengths from about 8 Hz up to 60-80 Hz. The source must have sufficient power across the spectrum so that the seismic waves have measurable amplitude at the surface after transiting deep into the earth, reflecting from or refracting through layers in the earth and transiting back to the surface. A last major characteristic of a desirable seismic source is that the energy from the source is distinguishable in the data record from seismic energy from other sources whether from background sources or other seismic prospecting.

Explosive charges have long been used as seismic sources although the intense release of energy is typically not permitted except in remote locations. Explosive sources, however, provide a wide array of wavelengths with considerable power across the wavelengths.

Hydraulic reciprocating seismic vibrators or vibes have been in use for many years using a baseplate connected to hydraulic rams that cause a reaction mass to reciprocate up and down to shake the ground through the baseplate. The hydraulic rams are operated to move the reaction mass through a sweep of the desired frequencies. However, the hydraulic systems are limited in their ability to provide sufficient power at high frequencies due to limitations of hydraulic flow in and out of the hydraulic cylinders. At very high hydraulic velocities, the hydraulic fluid is subject to cavitation when reversing directions that limits the amplitude of the movement of the reaction mass and thus the energy input in to the earth. At low frequencies it is difficult for the hydraulic vibe to have enough travel to generate a low frequency wave into the ground. For example, consider how one would generate a one Hz wave with a hydraulic vibe. A very long throw of the reaction mass is needed to generate that wavelet because the mass has to be moving down and up the full one second.

BRIEF SUMMARY OF THE DISCLOSURE

The invention more particularly relates to a vibratory seismic source for delivering acoustic energy into the ground for seismic prospecting including a generator for creating electric power and a plurality of linear motors arranged in a grid and each linear motor including a rod that is arranged to move generally vertically to contact the ground with a lower end of the rod. A control system is included for controlling movement of the rods such that the rods vibrate the ground and deliver acoustic energy into the ground. A plurality of wheels are included on which to convey the source from location to location wherein at least one electrically powered motor is arranged to raise and lower the wheels for transiting around the survey area and adjust for delivering acoustic energy into the ground.

The invention also relates to process for delivering acoustic energy into the earth for seismic prospecting where electric power is created on a mobile seismic source and electric power is used on the mobile seismic to raise and lower wheels on the mobile seismic source and thereby raise and lower the seismic source with respect to the ground. The electric power is used to move a rod of a linear electric motor generally vertically to contact the ground with a lower end of the rod at the selected location and the movement of the rods is controlled such that the rods vibrate the ground and deliver acoustic energy into the earth.

"Generally vertical" or "generally vertically" should be interpreted as meaning "with an axis of movement sufficiently nearly vertical with respect to the ground so as effectively to impart energy to the ground." Normally, the axis of movement would be less than 20 degrees to vertical, or in another embodiment less than 10 degrees to vertical.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
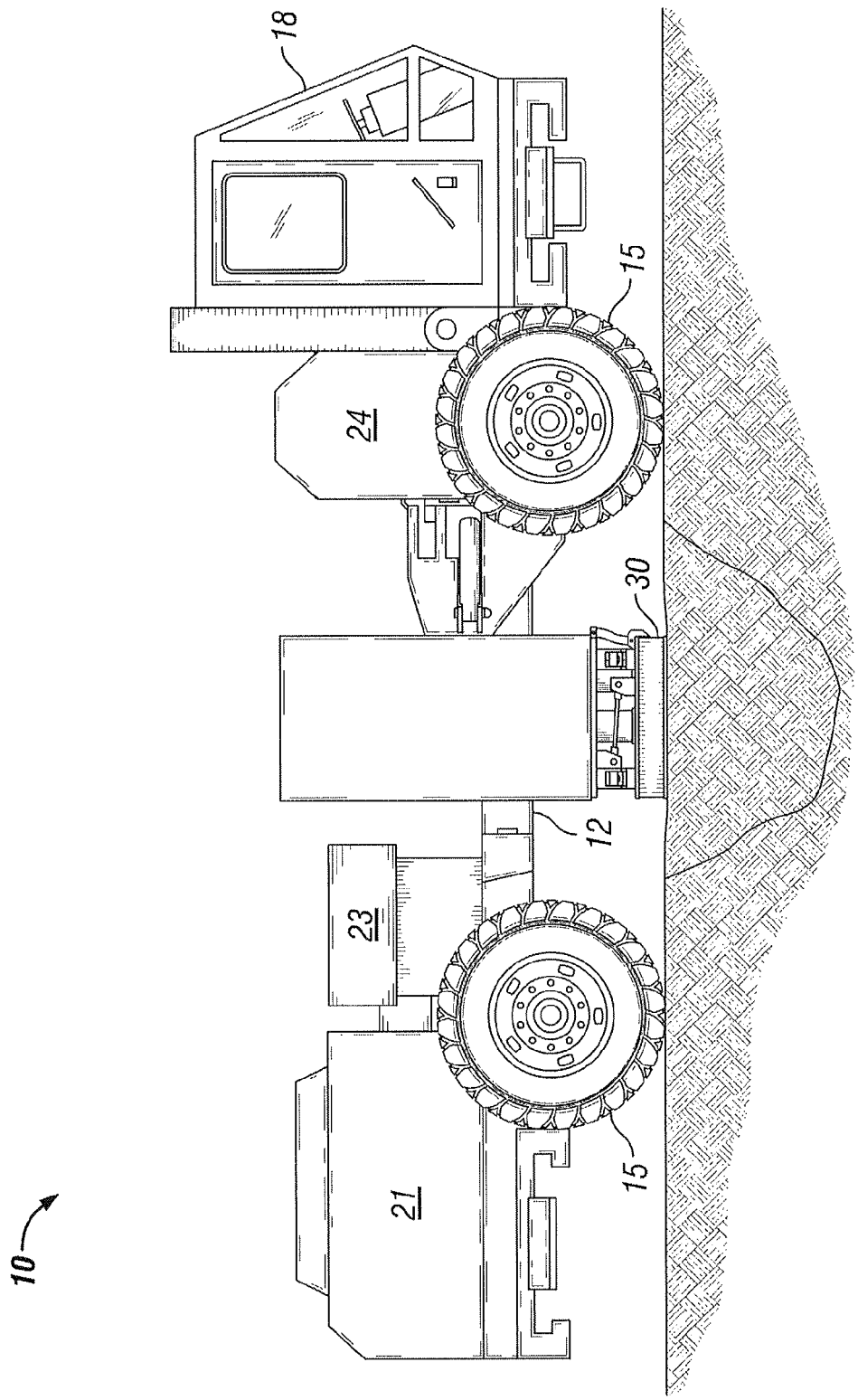
FIG. 1 is an elevation view of a discrete electric seismic source unit.

As shown in FIG. 1, an alternative vibrator seismic source 10 is shown comprising a chassis 12, four wheels 15 and a driver's cab 18. The alternative vibrator actuator source 10 uses a diesel engine 21 to turn an electric generator 23 and uses electric power to power the source 10 both for delivering acoustic energy into the ground and for moving along the ground from location to location. The source 10 utilizes electricity for all of its power needs. An electric power accumulator 24, such as a large battery, capacitor bank or both are included to store energy for high load situations of high electrical demand or when there are problems with the generator 23, but the power accumulator 24 could also provides the power to return to a location for repair.

Figure 2:
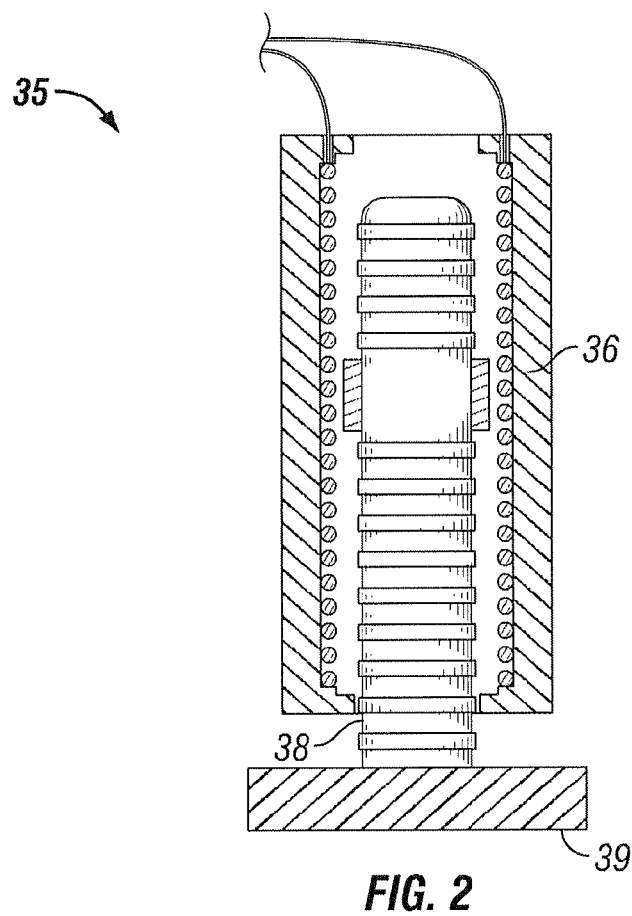
FIG. 2 is an enlarged fragmentary view of an electromechanical linear motor assembly for delivering seismic energy into the ground.
Figure 3:
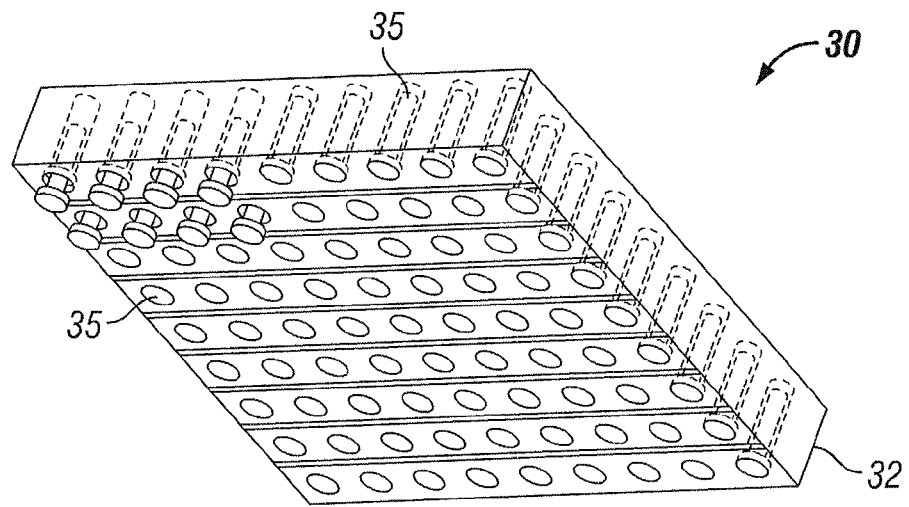
FIG. 3 is an enlarged perspective fragmentary view of a grid of electro mechanical linear motor assemblies for cooperatively delivering seismic energy into the ground.

Referring now to FIGS. 2 and 3, the acoustic energy delivery system 30 is carried under the chassis 12 and comprises a frame 32 that carries a number of linear motors 35. Linear motors are commercially available equipment and each manufacturer has variations on the design, but in principal, each linear motor 35 includes a tubular body 36 and a rod or actuation bar 38 positioned within the tubular body 36 that extends telescopically from the lower end of the tubular body 36. A replaceable foot 39 is attached to the bottom end of the rod 38 for contacting the ground. The frame 32 includes mounts for a grid of linear motors 35. In one envisioned embodiment, the frame 32 has approximately 112 linear motors 35 that are arranged in a grid of perhaps 8 by 14. Each linear motor is capable of outputting a peak acceleration force of approximately 2400 Newtons (N) or approximately 540 pounds-force while using 34 amps RMS (Arms) at 240 volts AC. The 112 linear motors would then be capable of outputting 268,800 N or 60,480 pounds-force using approximately 914 kilowatts of power. An additional advantage to the linear motor is that they come in varying sizes and force output that that can be tuned to achieve a desired acceleration, force and sustained velocity of motion. Also, the electronic control for the linear motor is well understood because of their wide use in manufacturing applications.

In operation, the frame 32 is lowered into proximity to the ground G and the linear motors 35 are operated to lower the replaceable feet 39 into contact with the ground G. Once all of the replaceable feet 39 are in contact with the ground G, the linear motors 35 are activated to thrust the rods 38 toward the ground G and deflect the ground G and thereby deliver an impulse into the earth. The linear motors 35 are quickly operated to recoil the rods 38 under control without disengaging contact with the ground G by the replaceable feet 39. By successive thrusts and recoils, a sweep of acoustic energy is effectively delivered into the earth while the feet remain in contact with the ground G. It should be noted that the undulations and irregularities of the ground G may be accommodated avoiding decoupling across the dimension of the frame 32. This method may be arranged to automatically compensate for surface topographic variations along with soft and hard spots on the ground surface like rocks or logs. While it is recognized that ground typically does not deflect much, it does not take much deflection with a 60,000 pound vibrator holding the replaceable feet 39 to the ground G to deliver very useful acoustic energy. In this procedure, all of the linear motors 35 would be operated at the same time using electrical power created by the electric generator 23. The impulses would be repeated in a sequence where the impulse would occur with progressively increasing or decreasing rapidity such that a progression of frequencies of impulse forces would effectively deliver acoustic energy into the earth. The acoustic energy being characterizeable as a progressive sweep of frequencies covering a spectrum from about 1 Hz up to at least 80 Hz and preferably up to 120 Hz.

The electric linear motors 35, working in conjunction, would not suffer the limitations of the hydraulic pumping systems at high frequency. Cycling electric power to the linear motors 35 to cause controlled movement of the rods 38 within the tubular bodies 36 and with such instant response the impulse frequency range is greatly expanded. By using electrical control circuits that are commonly available for diesel electric train locomotives and hybrid cars, the power can be applied instantly with a very high degree of control and stabilization. Linear motors are highly controllable due to the ability to control the force and velocity of the rods 38 via changes in the voltage and amperage of the applied current. Also the back-EMF generated can be accurately used as a feedback circuit to compensate for variations in the wear patterns and ground impedance variations so that the combined sweep of the whole group of linear motors is consistent and repeatable.

It should be recognized that higher frequencies than typically delivered may be achievable by the source 10. Perhaps frequencies as high as 200 Hz or higher may become useful in the field of seismic prospecting. There is no recognized reason that source 10 cannot deliver such high frequency acoustic energy into the ground G. And it is generally understood that high frequency energy provides high resolution data. Unfortunately, high frequency energy attenuates in the earth more rapidly than low frequency energy. With a large number of linear electric motors, whether 2000, more than 2000 or less than 2000, will be able to deliver high energy at high frequency. The size of the linear motors may be reduced or increased to adjust and adapt to ideal energy delivery system to create an optimal frequency range with high energy across the spectrum. The selection of the specific linear motors is an engineering issue at production time because they can be sourced to have a large thrust force but with short strokes as compared to those that have longer strokes with less thrust, but higher speeds. The alternative vibrator actuator source 10 invention is the substitution of electric power for hydraulic power in a vibrator source. In a preferred embodiment the alternative vibrator actuator source 10 is comprised of the following main components: (1) a vehicle component comprising an articulated vehicle chassis 12 with drivers' cab 18 capable of supporting the equipment and sustaining the rigors of a vibrator source; (2) a mechanical generator system that is made up of a diesel engine 21-electric generator 23 package, an electric power accumulator 24, power conditioner, power distribution center, and all necessary cables and switches; (3) an electromechanical acoustic energy delivery system 30; and (4) a control system for controlling the delivery of acoustic energy by the electromechanical acoustic energy delivery system 30.

Figure 4:
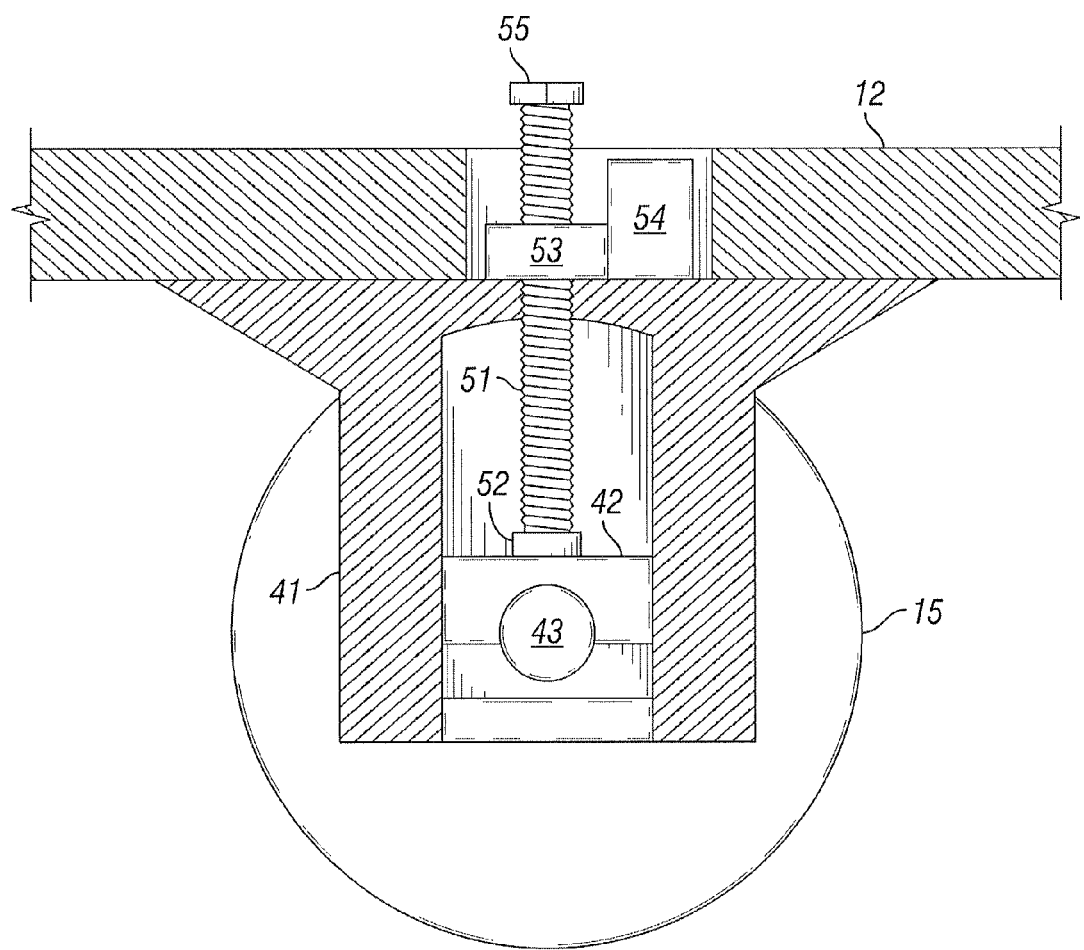
FIG. 4 shows an enlarged fragmentary view of the mechanism for driving and raising and lowering a wheel on the seismic source unit.

In the preferred embodiment of the present invention, the seismic source 10 utilizes electric motors at each wheel 15 to drive the source 10 around the survey area similar to what is used in other electric propelled trucks, hybrid cars or even golf carts. Turning now to FIG. 4, the wheels are mounted to the chassis 12 of the source 10 using a grooved yoke 41 and a block 42. The yoke 41 is fixed to the chassis 12 by bolts or welding and the block is arranged to move or slide vertically within the yoke to raise and lower the wheel. Motor 43 is mounted within the block 42 which attaches directly to the wheel and causes the wheel 15 to rotate to propel the source 10. The block 42 is raised and lowered by interaction of a screw rod 51 attached to the block 42 and a screw drive 53. An electric stepper motor 54 is attached to the screw drive 53 to raise and lower the screw rod 51 and thereby raise and lower the block 42. A load sensor 52 is arranged at the connection of the screw rod 51 and the block 42 to sense the weight of the source on the wheel 15. A motion sensor 55 senses vertical movement at the wheel. Both sensors 52 and 55 report their information to a central control system (not shown) on the source 10. In operation, the source 10 may move onto a predetermined source location and either lower the frame 32 to put the linear motors 35 into proximity with the ground. Alternatively, the source may squat down to bring the frame 32 into proximity with the ground by raising the wheels using the screw rod 51. Secondly, the wheels 15 may be individually adjusted to provide the source 10 into a more level or horizontal orientation. Third, one aspect of providing effect acoustic energy into the earth is to have a significant portion of the weight of the source 10 be applied to the ground through the rods 38 and for the weight to be as consistent as possible through the sweep of the impulses. Load sensor 52 is arranged to measure the amount of weight being born by the respective wheel 15 and the step motor 54 may adjust the height of the wheel 15 through the screw rod 51 to maintain consistent weight on the wheel, and effectively maintain a consistent weight on the rods 38.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A vibratory seismic source for delivering acoustic energy into the ground for seismic prospecting, the source comprising:
    a) a generator for creating electric power;
    b) a plurality of linear motors arranged in a grid and each including a rod that is arranged to move generally vertically to contact the ground with a lower end of the rod;
    c) a control system for controlling movement of the rods such that the rods vibrate the ground and deliver acoustic energy into the ground; and
    d) a plurality of wheels on which to convey the source from location to location; and
    e) at least one electrically powered motor to raise and lower the wheels for transiting around the survey area and adjust for delivering acoustic energy into the ground.

2. The vibratory seismic source according to claim 1, wherein the linear motors are carried by a frame, and the source includes an electric powered system to raise and lower the frame to the ground so that the rods may be operated into contact with the ground and raised up and clear of the ground when the source is moved from location to location.

3. The vibratory seismic source according to claim 1, further including a diesel engine to drive the generator.

4. The vibratory seismic source according to claim 1, wherein the mobile seismic source includes at least three wheels and each wheel includes a screw rod and screw drive assembly to individually raise and lower each of the three wheels on the mobile seismic source.

5. The vibratory seismic source according to claim 4, wherein the screw rod and screw drive assembly for each wheel further includes a load sensor to sense the weight on each wheel so that the effective weight on the ground through the lower ends of the rods may be monitored, adjusted or maintained while acoustic energy is delivered into the earth.

6. The vibratory seismic source according to claim 1, wherein the linear motors are arranged in a grid between 10 and 5,000, such as between 100 and 2,000, for example between 200 and 1,000.

7. A process for delivering acoustic energy into the earth for seismic prospecting, the process comprising:
    a) creating electric power on a mobile seismic source;
    b) using electric power on the mobile seismic to raise and lower wheels on the mobile seismic source and thereby raise and lower the seismic source with respect to the ground;
    c) using the electric power to move a rod of a linear electric motor generally vertically to contact the ground with a lower end of the rod at the selected location; and
    d) controlling movement of the rods such that the rods vibrate the ground and deliver acoustic energy into the earth.

8. The process for delivering acoustic energy into the earth according to claim 6 further including the step of lowering each of the rods to the ground and maintaining the lower ends of the rods in continuous contact with the ground as the acoustic energy is delivered into the earth.

9. The process for delivering acoustic energy into the earth according to claim 7 wherein the rods are successively thrust against the ground and recoiled away from the ground without losing contact with the ground to deliver a series of impulses into the earth such that the timing for the impact, recoiling and successive impact progresses through a frequency spectrum to include a range of frequencies for acquiring reflections from the earth at geophones arrayed across a survey area.

10. The process for delivering acoustic energy into the earth according to claim 7 wherein the step of raising a lowering the wheels is performed to maintain a consistent weight of the vibe through the lower ends of the rods and onto the ground while delivering acoustic energy into the earth.

11. The process for delivering acoustic energy into the earth according to claim 7 wherein the step of raising a lowering the wheels is performed to maintain the mobile seismic source relatively level while delivering acoustic energy into the earth.

12. The process for delivering acoustic energy into the earth according to claim 7 wherein the step of raising a lowering the wheels is performed to lower the mobile seismic source so that the rods are in close proximity to the ground prior to lowering the rods to the ground.

13. The process for delivering acoustic energy into the earth according to claim 6 wherein a plurality of rods, e.g. between 10 and 5,000, such as between 100 and 2,000, for example between 200 and 1,000.

* * * * *